July 16, 1946.  E. H. LAND ET AL  2,404,302

RANGE FINDER

Filed April 22, 1943

INVENTORS.
Edwin H. Land
and
Dexter P. Cooper, Jr.
BY
Donald L. Brown
Attorney

Patented July 16, 1946

2,404,302

UNITED STATES PATENT OFFICE 2,404,302

RANGE FINDER

Edwin H. Land, Cambridge, Mass., and Dexter P. Cooper, Jr., Washington, D. C., assignors to Polaroid Corporation, Cambridge, Mass., a corporation of Delaware Application April 22, 1943, Serial No. 484,005

5 Claims. (Cl. 88—2.6)

This invention relates to a new and improved range finder and reticles therefor.

It is one object of the invention to provide a range finder comprising means for impressing optical indicia upon the field of view at a predetermined apparent distance from the instrument and thereby determining the distance of objects in said field from the observer.

Another object is to provide a range finder of the above characteristics wherein a plurality of optical indicia are impressed upon the field of view, each at predetermined different apparent distances from the instrument.

A further object is to provide a range finder of the above characteristics wherein the desired stereoscopic image or images of optical indicia are produced by means of one or more pairs of light-polarizing indicia elements, marks or the like, of opposite polarization characteristics in combination with means for collimating the light traversing said indicia elements, and means for insuring that each eye of the observer see only one image in each of said pairs.

A still further object is to provide a new reticle adapted for use in a range finder of the above characteristics and comprising a stereoscopic light-polarizing print having one or more pairs of right-eye and left-eye polarizing indicia elements, marks or the like, of opposite polarization characteristics, the indicia elements comprising each of said pairs being positioned at predeterminedly different distances apart in order that an observer may fuse them to form a series of stereoscopic images, each of which will appear to lie at a different distance from the observer.

Other objects and advantages will in part be apparent and in part be pointed out in the course of the following description of one or more embodiments of the invention, which are given as non-limiting examples, in connection with the accompanying drawing, in which.

Figure 1:
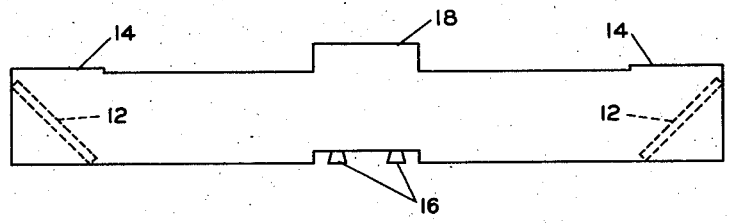
Figure 1 is a plan view of a housing suitable for a range finder constituting an embodiment of the invention.

In the form of the invention illustrated in the drawing, housing 10 of any desired size and shape is provided with a pair of mirrors or other reflecting surfaces 12 adapted to receive light from in front of the instrument through the windows or apertures at 14. This arrangement serves both to provide an effectively enlarged interocular distance or increased stereoscopic effect, and also to limit the field of view to an area substantially in front of the instrument. Associated with mirrors 12 is a pair of transparent mirrors 15 each of which is adapted to receive light from one of mirrors 12 and to reflect it towards one of eyepieces 16.

An observer employing this range finder will look simultaneously through both of eyepieces 16 with the result that his right eye will receive light from right-hand mirrors 12 and 15, and his left eye will simultaneously receive light from lefthand mirrors 12 and 15. It is to be understood that mirrors 15 and mirrors 12 should be so positioned as to enable an observer employing the instrument to see substantially the same field with each eye. Such a structure, except for the use of transparent mirrors 15 instead of wholly reflecting surfaces, is standard in the construction of range finders of the class of the present invention. Its effect and purpose is to increase the effective interocular distance of the observer to the distance between mirrors 12, and thus to increase considerably the stereoscopic acuity of his vision as applied to the field.

Figure 2:
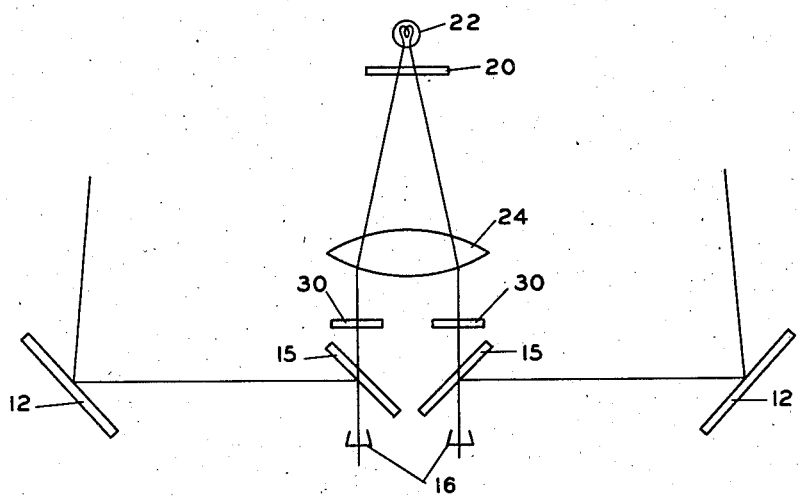
Fig. 2 illustrates diagrammatically and in plan the optical elements employed in one embodiment of the invention.
Figure 3:
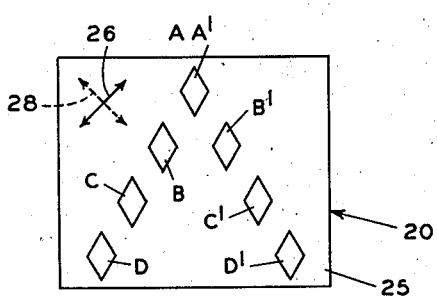
Fig. 3 is an enlarged diagrammatic view illustrating a stereoscopic, light-polarizing print suitable for use as a reticle in the range finder of the invention.

The indicia-forming apparatus of this embodiment of the invention is illustrated in detail in Figs. 2 and 3, and may conveniently be located within an extended portion 18 of housing 10. It comprises a reticle 20 of particular characteristics to be described in detail hereinafter, a light source 22 of any desired type and a relatively large lens 24 or other device for collimating the rays emanating from source 22 and traversing reticle 20. The term "reticle" as it is used herein and in the claims is to be understood as having the meaning commonly accorded thereto in the range finder art, and it is to be considered as including any means in the optical system of the instrument for producing visible indicia such, for example, as a line, a dot or a circle or other figure.

In the preferred embodiment of the present invention, reticle 20 comprises a light-polarizing stereoscopic print of the type shown and described in Patent No. 2,203,687. More specifically, it may comprise a sheet 25 of a transparent plastic material having reproduced thereon by means of light-polarizing areas a series of stereoscopic pairs of images comprising right-eye images, indicia elements, marks or the like, A, B, C, D, having their transmission axes parallel, for example, to arrow 26, and left-eye images, indicia elements, marks or the like, A', B', C', D', having their transmission axes at right angles to arrow 26, as represented by arrow 28.

A suitable material for use as the base sheet in producing reticle 20 is polyvinyl alcohol, and in one embodiment of the invention reticle 20 may comprise a sheet 25 of said material having the molecules on one surface thereof oriented parallel to arrow 26 and the molecules on the other surface thereof oriented parallel to arrow 28. Alternatively, reticle 20 may comprise a composite sheet 25 formed by bonding two molecularly oriented layers of polyvinyl alcohol together with their directions of molecular orientation relatively perpendicular. Such a sheet is shown and described, for example, in U. S. Patent No. 2,289,715. Images A, B, C, etc. may be produced by dyeing or staining the molecularly oriented surfaces of the polyvinyl alcohol sheet with a suitable dichroic dye or stain, such for example as a solution of iodine and an iodide.

In the operation of the invention, reticle 20 is positioned substantially in the focal plane of lens 24, and elements 30 comprise polarizers arranged so that each eye of the observer will see only its proper set of the images of reticle 20. Thus, right-eye polarizer 30 may have its axis parallel to arrow 28 and left-eye polarizer may have its axis parallel to arrow 26. When reticle 20 is viewed through eye-pieces 16 and polarizers 30, the observer will see only a single set of stereoscopic images AA', BB', CC', and DD', each of which will appear to lie at a different vertical plane in space owing to the various amounts by which the component images of the stereoscopic pairs are laterally offset. The elements of stereoscopic pair AA' are illustrated as being substantially superimposed, and the stereoscopic image formed thereby will appear to lie farthest from the observer, while stereoscopic image DD' will appear nearest to the observer, CC' the next, and BB' farthest away with the exception of AA'.

It will be understood that the relative lateral displacement of the two indicia elements forming each of the stereoscopic pairs in reticle 20 will be such that the stereoscopic images formed thereby will appear to lie at known distances from the instrument. Said distances may in turn be determined in a variety of ways. If, for example, mirrors 15 are at right angles to each other and parallel to their associated mirrors 12, reticle image AA' will appear to lie at infinity with respect to space, with reticle images BB', CC' and DD' progressively nearer the instrument in the field. If, however, mirrors 15 are at right angles to each other and mirrors 12 are at an angle of less than 90 degrees to each other, or vice versa, reticle image AA' will appear to lie nearer in space than infinity, with images BB', CC' and DD' correspondingly nearer. The actual ranges of said apparent positions will be dependent in each case upon the base line of the device, i. e. the distance between mirrors 12.

Although it is preferred to place reticle 20 substantially within the focal plane of lens 24, this arrangement is not essential, and it is possible to obtain further variation of the relationship between the reticle images and the field by changing the relative positions of reticle 20 and lens 24. If, for example, reticle 20 is slightly nearer lens 24 than the focal plane of the lens, the series of reticle images will appear to lie in the field nearer to the instrument than when the reticle is within the focal plane of the lens. All such modifications embody the essentials of the invention, and are accordingly to be construed as coming within the scope thereof.

It will now be apparent that in all cases the range finder of the invention will be so calibrated that the series of reticle marks will appear to lie at known distances from the instrument. An observer using the device may therefore compute the approximate distance of objects in the field by their relation in space to the apparent positions of the images. It will be apparent, furthermore, that the invention contemplates the employment of any useful number of reticle images, although the essential requirements thereof are fulfilled if only a single stereoscopic pair of images, for example CC', is used.

It should be understood that indicia elements, marks or the like, A, B, C, etc. in reticle 20 may take any of many forms. For example, in a preferred case said indicia elements may comprise non-polarizing light-transmitting outlines in an otherwise uniformly light-polarizing sheet, and in this case said indicia elements will appear as outlines of light superimposed upon the field. Another example may comprise the converse of this case, with said indicia elements formed as light-polarizing outlines in an otherwise non-polarizing light-transmitting sheet, and in this case said indicia elements will appear as black outlines superimposed upon the field. In either of said examples, each of said indicia elements may comprise a solid area rather than an outline. Still further alternatives will be apparent to those skilled in the art, and are to be understood as coming within the scope hereof.

A reticle of the type shown in Fig. 3 is particularly useful with moving targets or when the range finder itself is moving towards the target. For example, it may be assumed that a range finder using reticle 20 is installed in a tank or airplane approaching a target and that it is desired to hold fire until the range is, for example, 200 yards. In this case, indicia elements D and D' will initially be so offset with respect to each other that the range of the apparent position of the stereoscopic image formed thereby will be 200 yards. Similarly, the stereoscopic image CC' may appear to lie at 300 yards and the stereoscopic image BB' may appear to lie at 400 yards. Therefore, as the tank or plane approaches the target, the gunner will know that he should prepare to fire when the apparent position of image BB' coincides with the target, should aim when the apparent position of image CC' coincides with the target, and should fire when the apparent position of image DD' coincides with the target. It is particularly useful, for example, in an airplane to utilize only a single stereoscopic pair of indicia elements in reticle 20 whose apparent position will lie at the known range which is the maximum for accurate fire for the weapons in connection with the range finder being used.

Figure 4:
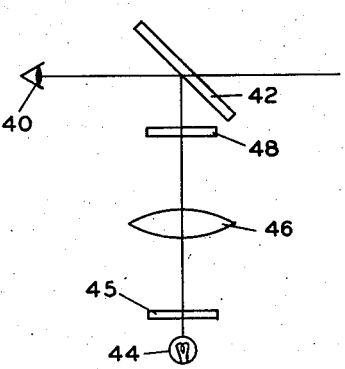
Fig. 4 is a side view, similar to Fig. 2, illustrating diagrammatically a modification of the invention.

It will be understood that the above-described embodiment of the invention is given only by way of illustration, and that it may be modified to a considerable degree without departing from within the scope of the invention. To a considerable extent the construction of the range finders of the invention is determined by the purpose for which they are intended. For example, mirrors 12 and 15 are used as illustrated in Figs. 1 and 2 for the purpose of increasing the range of the instrument and its accuracy at increased ranges. However, this construction may be modified if the instrument is designed for use at relatively shorter ranges, i. e. of the order of 100 yards or less. For such short ranges it may be desirable to rely only upon the human interocular, and Fig. 4 illustrates diagrammatically a modification of the invention suitable for such use. One eye of the observer is indicated at 40 as viewing the field through a single transparent mirror 42, and the reticle system comprises light source 44, reticle 45, lens 46 and a pair of analyzers 48, one for each eye of the observer. Many other modifications will doubtless be apparent to those skilled in the art, and are to be construed as coming within the scope of the invention.

It is also to be understood that the following claims are intended to cover all the generic and specific features of the invention herein described, and all statements of the scope of the invention which, as a matter of language, might be said to fall therebetween.

What is claimed is:

1. In a range finder having a left-eye and a right-eye viewing means through which an observer looks when viewing an object to be ranged and means for increasing the interocular of the observer, in combination, a reticle positioned in the field of said viewing means, said reticle being formed of transparent material having predetermined areas therein which are rendered light-polarizing and which form at least two indicia elements spaced with respect to each other to provide a stereoscopic pair which can be fused when viewed stereoscopically, the spacing between said indicia elements forming a stereoscopic pair being of a magnitude to cause the fused indicia elements to appear in said field at a predetermined apparent distance from the range finder when viewed through said viewing means, said areas being predeterminedly polarized so that only one of said indicia elements of a stereoscopic pair is visible when viewed in light polarized in a predetermined plane and only the other of such stereoscopic pair of indicia elements is visible when viewed in light polarized in a plane at 90° to said first named plane, and analyzing means in the field of each viewing means between said reticle and said viewing means whereby only a different indicia element of a stereoscopic pair is observable through each viewing means.

2. In a range finder having means for forming a left-eye image and a right-eye image of an object being ranged and also having individual left-eye and right-eye viewing means which are optically aligned respectively with said left-eye and right-eye image forming means and through which an observer looks simultaneously with his left eye and his right eye for viewing said respective images, in combination, a reticle positioned in the field of said viewing means, said reticle being formed of transparent material having predetermined areas therein which are rendered light polarizing and which form at least two indicia elements spaced with respect to each other to provide a stereoscopic pair which can be fused when viewed stereoscopically, said areas being predeterminedly polarized so that only one indicia element of a stereoscopic pair is visible when viewed in light polarized in a predetermined plane and only the other indicia element of such stereoscopic pair is visible when viewed in light polarized in a plane at 90° to said first named plane, a light source positioned on the side of said reticle most distant from said viewing means, light from said source being transmitted through said reticle, collimator means positioned between said reticle and said viewing means at a location out of alignment with said image forming means for collimating light passing through the reticle and directing a portion thereof to one of said viewing means and another portion to the other of said viewing means, and analyzing means in the field of each viewing means between said reticle and said viewing means whereby only one indicia element of each stereoscopic pair is observable through one viewing means and only the other indicia element of each stereoscopic pair is observable through the other viewing means.

3. In a range finder having a left-eye and a right-eye viewing means through which an observer looks when viewing an object to be ranged and means for increasing the interocular of the observer, in combination, a reticle positioned in the field of said viewing means, said reticle being formed of transparent material having predetermined areas therein which are rendered light polarizing and which form groups of indicia elements, pairs of indicia elements in the different groups being spaced apart for stereoscopic combination when viewed stereoscopically, the spacing between the stereoscopic pairs of indicia elements in the different groups being different and of magnitudes to cause the stereoscopically combined indicia elements in each different group to appear in said field at predetermined but different apparent distances from the range finder when viewed stereoscopically through said viewing means, said areas forming said indicia elements being predeterminedly polarized so that only one indicia element of each stereoscopic pair is visible when viewed in light polarized in a predetermined plane and only the other indicia element of each stereoscopic pair is visible when viewed in light polarized in a plane at 90° to said first named plane, and analyzing means in the field of each viewing means between said reticle and said viewing means whereby only one indicia element of each stereoscopic pair is observable through the left-eye viewing means and only the other indicia element of each stereoscopic pair is observable through the right-eye viewing means.

4. A reticle for a binocular range finder, comprising transparent material which is capable of being rendered light-polarizing when in a molecularly oriented condition by the incorporation therein of a dichroic material, said reticle material having the molecules thereof in at least one predetermined area substantially oriented in a predetermined direction and the molecules thereof in at least a second predetermined area substantially oriented in a direction substantially at 90° to said first named direction and also having a dichroic material incorporated in each of said areas, each predetermined area forming at least one of a stereoscopic pair of indicia elements, the corresponding elements of each pair being spaced apart by a predetermined distance for stereoscopic combination to appear in a plane located at a predetermined apparent distance from an observer when viewed stereoscopically by said observer.

5. A reticle for a binocular range finder, comprising transparent material having predetermined light-polarizing areas provided therein which form a plurality of groups of indicia elements, pairs of indicia elements in each group being spaced apart for stereoscopic combination when viewed stereoscopically, the spacing between the indicia elements in different groups being different and of a magnitude such that stereoscopic pairs of indicia elements in the different groups appear in planes located at different and predetermined apparent distances from an observer who is viewing the reticle stereoscopically, the transmission axis of a light-polarizing area forming one of the indicia elements of each stereoscopic pair being substantially at 90° to the transmission axis of a light-polarizing area forming the other element of each stereoscopic pair of indicia elements.

EDWIN H. LAND.
DEXTER P. COOPER, Jr.